United States Patent
Shi et al.

(10) Patent No.: US 12,550,022 B2
(45) Date of Patent: Feb. 10, 2026

(54) METHOD OF WTRU TO NETWORK RELAY HANDOVER

(71) Applicant: INTERDIGITAL PATENT HOLDINGS, INC., Wilmington, DE (US)

(72) Inventors: Xiaoyan Shi, Westmount (CA); Behrouz Aghili, Commack, NY (US); Saad Ahmad, Montreal (CA); Michelle Perras, Montreal (CA); Ulises Olvera-Hernandez, Saint-Lazare (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 421 days.

(21) Appl. No.: 17/926,166

(22) PCT Filed: May 21, 2021

(86) PCT No.: PCT/US2021/033685
§ 371 (c)(1),
(2) Date: Nov. 18, 2022

(87) PCT Pub. No.: WO2021/237107
PCT Pub. Date: Nov. 25, 2021

(65) Prior Publication Data
US 2023/0199594 A1    Jun. 22, 2023

Related U.S. Application Data

(60) Provisional application No. 63/028,258, filed on May 21, 2020.

(51) Int. Cl.
*H04W 36/08* (2009.01)
*H04W 36/00* (2009.01)

(52) U.S. Cl.
CPC ....... *H04W 36/08* (2013.01); *H04W 36/0079* (2018.08)

(58) Field of Classification Search
CPC . H04W 36/08; H04W 36/0079; H04W 88/04; H04W 36/083; H04W 36/085; H04W 36/087; H04W 36/13
See application file for complete search history.

(56) References Cited

U.S. PATENT DOCUMENTS

2012/0252355 A1    10/2012  Huang et al.
2018/0139794 A1*   5/2018   Chae ................... H04W 56/002
(Continued)

FOREIGN PATENT DOCUMENTS

KR    2018-0122836         11/2018
KR    20180122836 A    *  11/2018    ............ H04W 36/34
WO    2018/171514          9/2018

OTHER PUBLICATIONS

KR20180122836A-English Translation (Year: 2025).*
(Continued)

*Primary Examiner* — Ji-Hae Yea
(74) *Attorney, Agent, or Firm* — VOLPE KOENIG

(57) ABSTRACT

A method addressing handover procedure failure or cancellation includes receiving, by a remote wireless transmit/receive unit (WTRU) connected to a source NodeB, a handover command to begin a handover procedure to establish a connection with a target NodeB on a network. A method may further include, on a condition that the handover procedure fails, transmitting, by a relay TRU, a handover failure/cancellation indication to the remote WTRU and cancelling, by the remote WTRU, the handover procedure. A method may also include initiating, by the
(Continued)

remote WTRU, a radio resource control (RRC) re-establishment procedure to connect with the source NodeB or a new NodeB.

20 Claims, 10 Drawing Sheets

(56) References Cited

U.S. PATENT DOCUMENTS

2019/0239147 A1    8/2019   Chun et al.
2020/0037218 A1*   1/2020   Karampatsis ....... H04W 36/087

OTHER PUBLICATIONS

Third Generation Partnership Project, "Technical Specification Group Services and System Aspects; System architecture for the 5G System (5GS); Stage 2 (Release 16)," 3GPP TS 23.501 V16.4.0 (Mar. 2020).
Third Generation Partnership Project, "Technical Specification Group Services and System Aspects; System Architecture for the 5G System; Stage 2 (Release 16)," 3GPP TS 23.501 V16.0.0 (Mar. 2019).
Third Generation Partnership Project, "Technical Specification Group Services and System Aspects; System architecture for the 5G System (5GS); Stage 2 (Release 16)," 3GPP TS 23.501 V16.8.0 (Mar. 2021).
Third Generation Partnership Project, "Technical Specification Group Services and System Aspects; System architecture for the 5G System (5GS); Stage 2 (Release 17)," 3GPP TS 23.501 V17.0.0 (Mar. 2021).
Third Generation Partnership Project, "Technical Specification Group Services and System Aspects; Procedures for the 5G System (5GS); Stage 2 (Release 16)," 3GPP TS 23.502 V16.4.0 (Mar. 2020).
Third Generation Partnership Project, "Technical Specification Group Services and System Aspects; Procedures for the 5G System; Stage 2 (Release 16)," 3GPP TS 23.502 V16.0.0 (Mar. 2019).
Third Generation Partnership Project, "Technical Specification Group Services and System Aspects; Procedures for the 5G System (5GS); Stage 2 (Release 16)," 3GPP TS 23.502 V16.8.0 (Mar. 2021).
Third Generation Partnership Project, "Technical Specification Group Services and System Aspects; Procedures for the 5G System (5GS); Stage 2 (Release 17)," 3GPP TS 23.502 V17.0.0 (Mar. 2021).
Third Generation Partnership Project, "Technical Specification Group Services and System Aspects; Study on system enhancement for Proximity based Services (ProSe) in the 5G System (5GS) (Release 17)," 3GPP TR 23.752 V17.0.0 (Mar. 2021).
Third Generation Partnership Project, "Technical Specification Group Services and System Aspects; Study on system enhancement for Proximity based Services (ProSe) in the 5G System (5GS) (Release 17)," 3GPP TR 23.752 V0.3.0 (Jan. 2020).
Third Generation Partnership Project, "Technical Specification Group Services and System Aspects; Study on Architecture Enhancements to ProSe UE-to-Network Relay (Release 15)," 3GPP TR 23.733 V15.1.0 (Dec. 2017).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2020 (Dec. 3, 2020).

* cited by examiner

METHOD OF WTRU TO NETWORK RELAY HANDOVER

CROSS REFERENCE TO RELATED APPLICATIONS

This application is the U.S. National Stage, under 35 U.S.C. § 371, of International Application No. PCT/US2021/033685 filed May 21, 2021, which claims the benefit of U.S. Provisional Application No. 63/028,258 filed May 21, 2020, which is incorporated by reference as if fully set forth.

BACKGROUND

Proximity Services (ProSe) are services that can be provided by a 3GPP system based on a wireless transmit/receive unit (WTRU) being in proximity to another WTRU. The ProSe WTRU-to-Network Relay entity may provide the functionality to support connectivity to the network for a Remote WTRU. Due to mobility, the UE-to-Network Relay may move from one NodeB (e.g., a gNodeB (gNB)) to another Node B (e.g., another gNB) together with the Remote WTRU. To keep service continuity, the handover procedure may be performed for both WTRU-to-Network Relay and the Remote WTRU. However, the handover procedure may be canceled by the network. The cancellation may be due to timer expiration, internal failure, the WTRU returning to the source NodeB, etc. The handover procedure may also fail due to the WTRU failing to access the target NodeB. Once the handover command has been sent the Remote WTRU and the handover procedure for WTRU-to-Network relay fails or is cancelled, the WTRU-to-Network relay will never access the new cell and broadcast the new cell information. Since the Remote WTRU is still waiting to receive target cell information to perform the rest of the procedure, the Remote WTRU may enter a pending status and remove all bearer contexts after a failure time expires. This may cause all ongoing services on the Remote WTRU to be interrupted.

SUMMARY

Systems, methods, and devices for addressing handover procedure failure or cancellation are disclosed herein. A remote WTRU connected to a source NodeB (e.g., a gNB) may receive a handover command to begin a handover procedure to establish connection with a target NodeB (e.g., a gNB). If the remote WTRU is able to access the target NodeB, the remote WTRU may begin communicating with a network via the target NodeB. If a WTRU-to-Network relay receives a handover failure/cancellation indication from the source NodeB or determines handover procedure failure based on a local decision (e.g., failed access to the target NodeB), the WTRU-to-Network relay may transmit a handover failure/cancellation indication to the remote WTRU. The remote WTRU may cancel the handover procedure and re-establish connection to the source NodeB.

In some embodiments a method addressing handover procedure failure or cancellation may include receiving, by a remote wireless transmit/receive unit (WTRU) connected to a source NodeB (e.g., a gNB), a handover command to begin a handover procedure to establish a connection with a target NodeB (e.g., a gNB) on a network. It further includes, on a condition that the handover procedure fails, transmitting, by a relay WTRU, a handover failure/cancellation indication to the remote WTRU and cancelling, by the remote WTRU, the handover procedure. The method also includes initiating, by the remote WTRU, a radio resource control (RRC) re-establishment procedure to connect with the source NodeB or a new NodeB.

In some embodiments, a method addressing handover procedure failure or cancellation may include receiving, by a remote wireless transmit/receive unit (WTRU) connected to a source NodeB (e.g., a gNB), a handover command to begin a handover procedure to establish a connection with a target gNB on a network. It may further include, on a condition that a source NodeB determines that the handover procedure fails or is canceled and identifying, by the source NodeB, the remote WTRU impacted by the handover procedure failure or cancellation. A method may also include transmitting, by the source NodeB, a handover failure/cancellation indication to the remote WTRU via a relay WTRU, and cancelling, by the remote WTRU, the handover procedure. I further includes initiating, by the remote WTRU, a radio resource control (RRC) re-establishment procedure to connect with the source NodeB or a new NodeB.

In yet another embodiment, a method addressing handover procedure failure or cancellation includes receiving, by a remote wireless transmit/receive unit (WTRU) connected to a source NodeB (e.g., a gNB), a handover command to begin a handover procedure to establish a connection with a target NodeB on a network, and triggering, by the relay WTRU, a handover to the target NodeB. It further includes, on a condition that the relay WTRU connects with the target NodeB, transmitting, by the relay WTRU, a handover command with target NodeB information to one or more remote WTRUs, and on a condition that the handover fails and the relay WTRU connects to a new NodeB, transmitting, by the relay WTRU, a handover command with new NodeB information to one or more remote WTRUs.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION

Figure 1A:
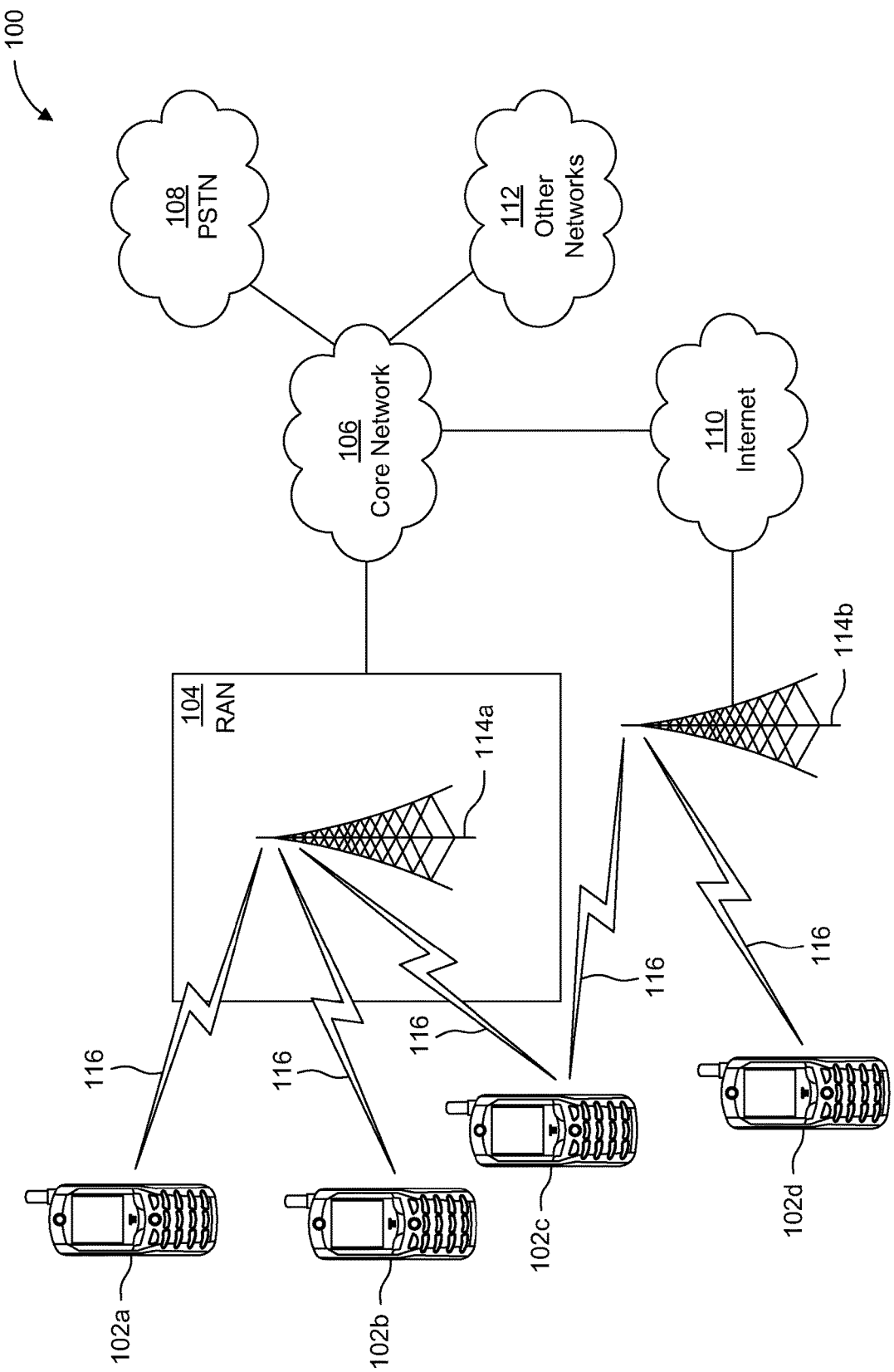
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
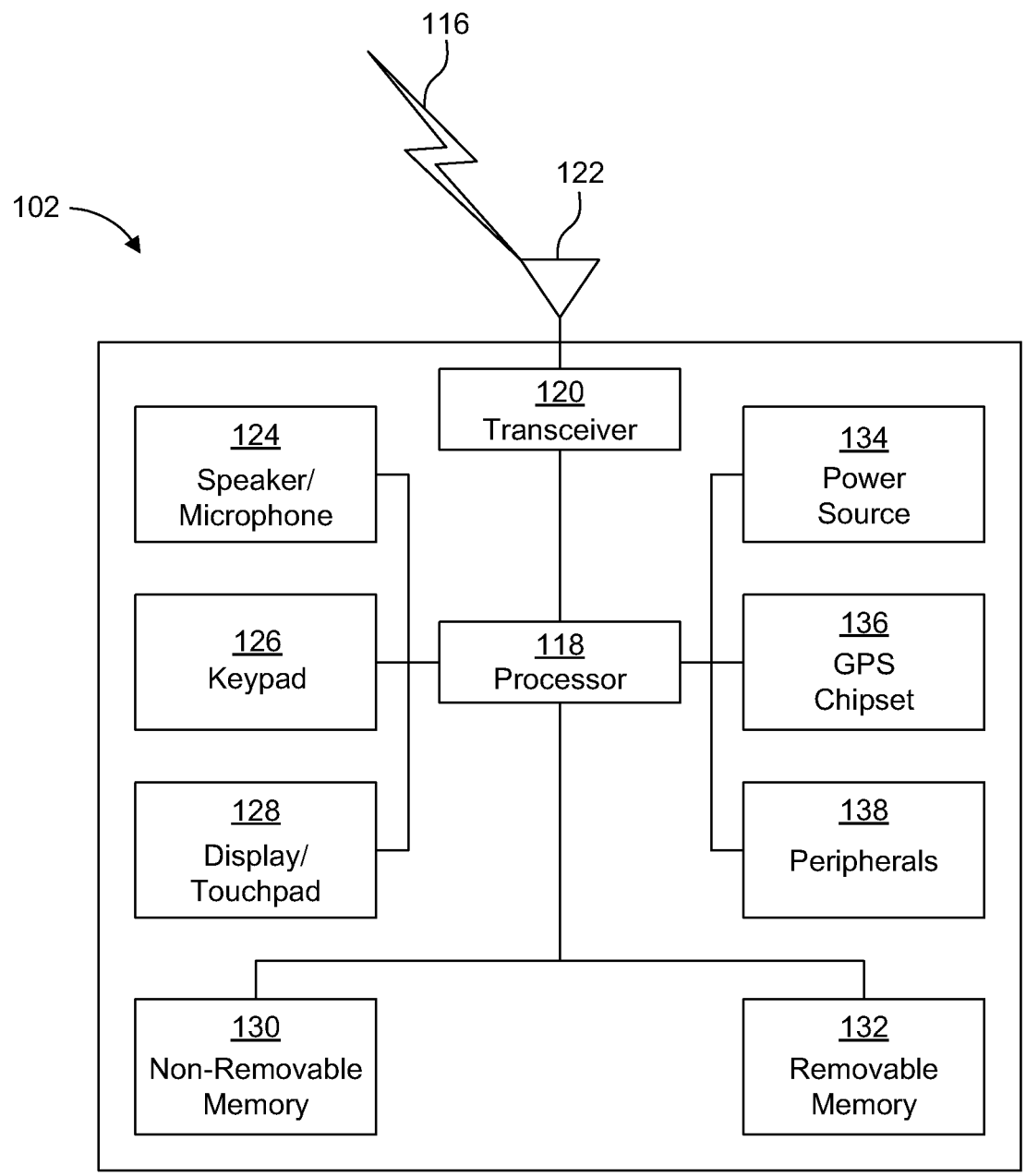
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
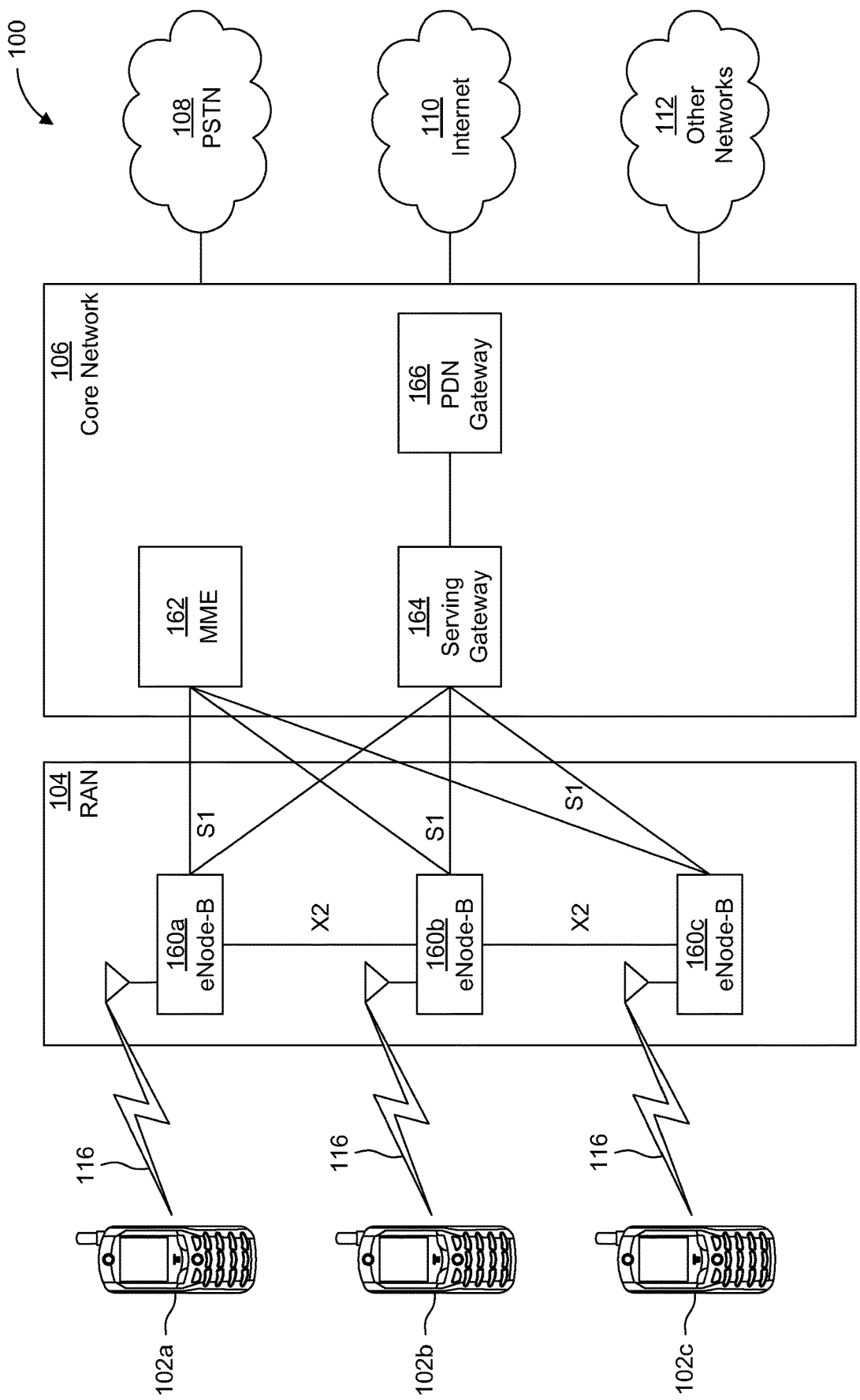
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
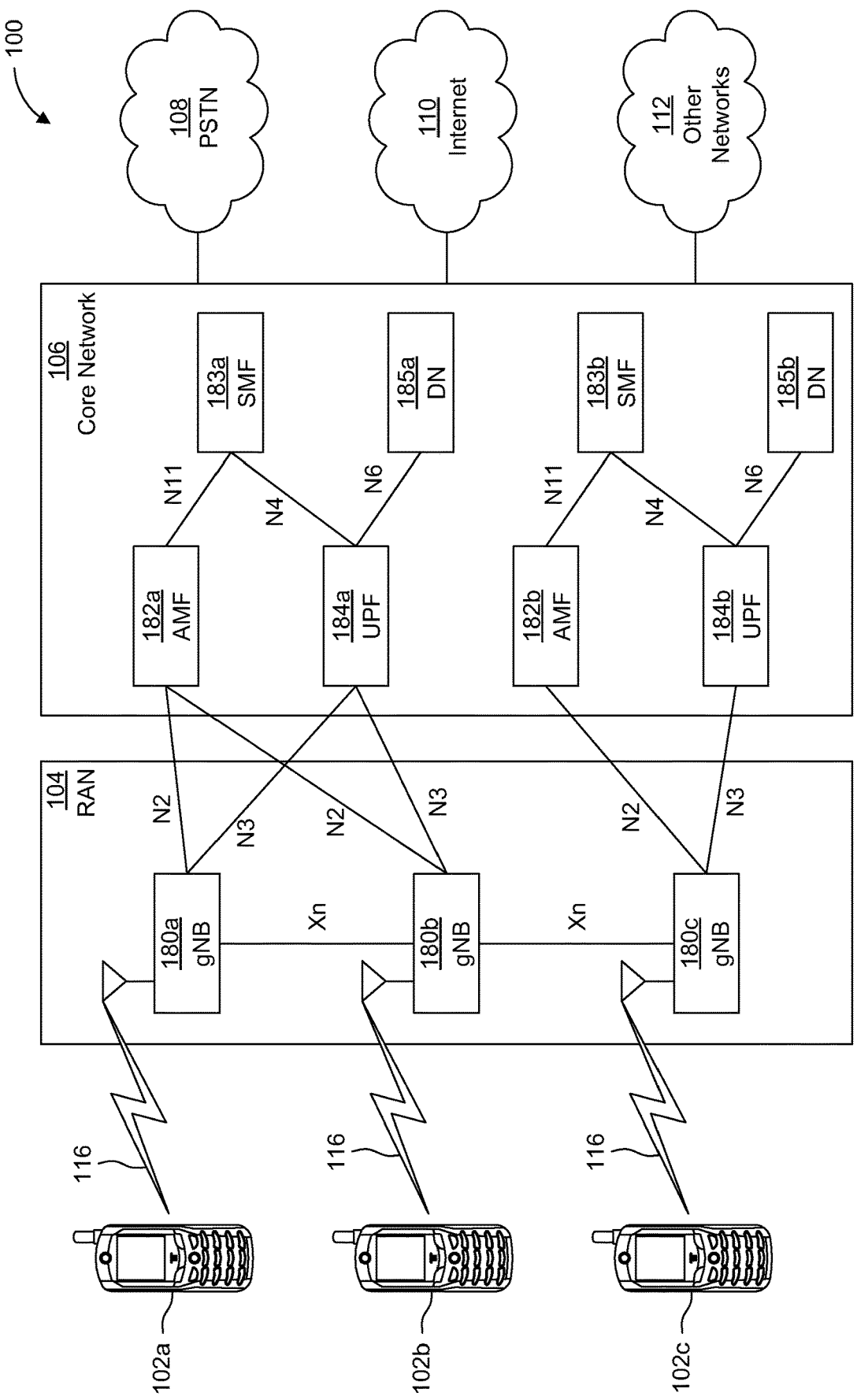
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a,184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Figure 2:
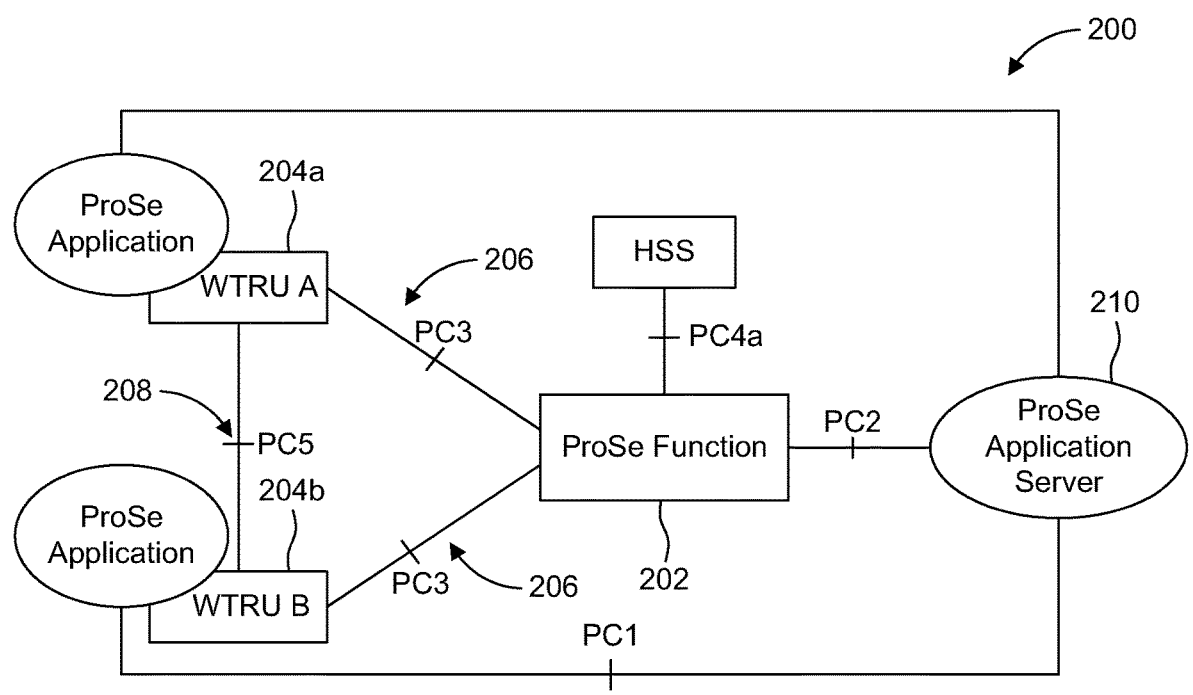
FIG. 2 is a diagram illustrating an architecture of proximity-based services according to an embodiment.

FIG. 2 is a diagram illustrating an architecture 200 of proximity-based services according to some embodiments. Proximity Services (ProSe) are services that may be provided by the 3GPP system based on WTRUs being in proximity to each other. The ProSe Function 202 may consist of the following main sub-functions: Direction Provisioning Function (DPF) and Direct Discovery Name Management Function. The DPF may be employed to provision the WTRU with necessary parameters in order to use ProSe Direct Discovery and ProSe Direct communication. The Direct Discovery Name Management Function may be used for open ProSe Direct Discovery to allocate and process the mapping of ProSe Applications IDs and ProSe Application Codes used in ProSe Direct Discovery.

ProSe-enabled WTRUs, such as WTRU A 204*a* and WTRU B 204*b* illustrated in FIG. 2, may support the following functions: exchange of ProSe control information between ProSe-enabled WTRU 204*a*, 204*b* and the ProSe Function 202 over PC3 interface 206 and procedures for open and restricted ProSe Direct Discovery of other ProSe-enabled WTRUs over a PC5 interface 208. The PC5 interface 208 may be a radio interface.

The ProSe Application Server 210 may support the storage of ProSe Application layer information. The ProSe Application layer information may include mapping of Application Layer User IDs and Network Layer ProSe User IDs.

Figure 3:
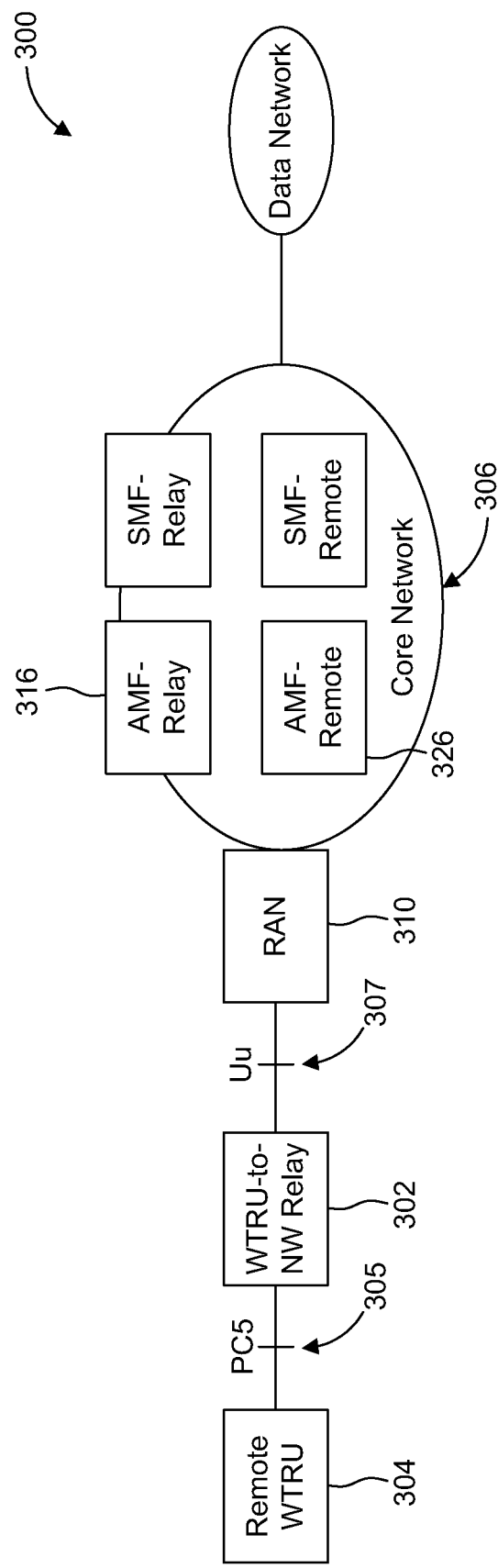
FIG. 3 is a diagram illustrating an architecture using a ProSe WTRU-to-Network Relay according to an embodiment.

FIG. 3 is a diagram illustrating an architecture 300 using a ProSe WTRU-to-Network Relay 302 according to some embodiments. The ProSe WTRU-to-Network Relay 302 entity provides the functionality to support connectivity to the network for Remote WTRUs 304.

If the remote WTRU 304 is out of coverage (e.g., NR coverage) and cannot communicate with the core network 306 directly (or in NR coverage but prefers to use PC5 305 for communication), the remote WTRU 304 may discover and select a WTRU-to-Network relay 302. The remote WTRU 304 may then establish a PC5 session with WTRU-to-Network Relay 302 and access the RAN 310 via the WTRU-to-network relay 302. When receiving a message from Uu interface 307, the RAN 310 may determine whether the signaling received is from WTRU-to-Network relay 302 itself or from the Remote WTRU 304 via the WTRU-to-network relay 302. The RAN 310 may then perform corresponding procedures with AMF-Relay 316 (AMF which serves the WTRU-to-Network Relay) or AMF-Remote 326 (AMF which serves the Remote WTRU).

Figure 4:
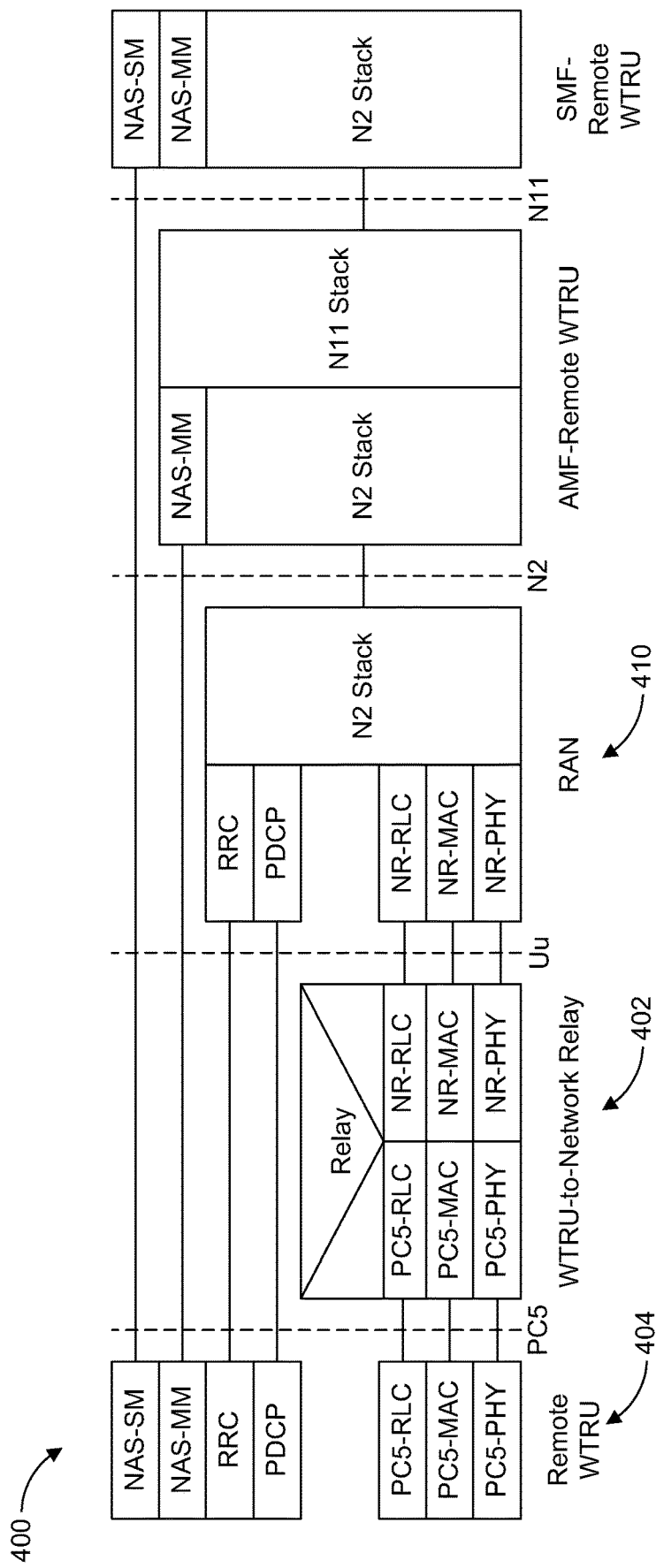
FIG. 4 is a diagram illustrating a control plane protocol stack according to an embodiment.

FIG. 4 is a diagram illustrating a control plane protocol stack 400 according to some embodiments.

Due to mobility, the WTRU-to-Network Relay 402 may move from one NodeB (e.g., a gNB) to another NodeB (e.g., another gNB) together with one or more remote WTRUs 404. To maintain service continuity, the handover procedure on the RAN 410 may be performed for both WTRU-to-Network Relay 402 and the one or more remote WTRUs 404.

Figure 5:
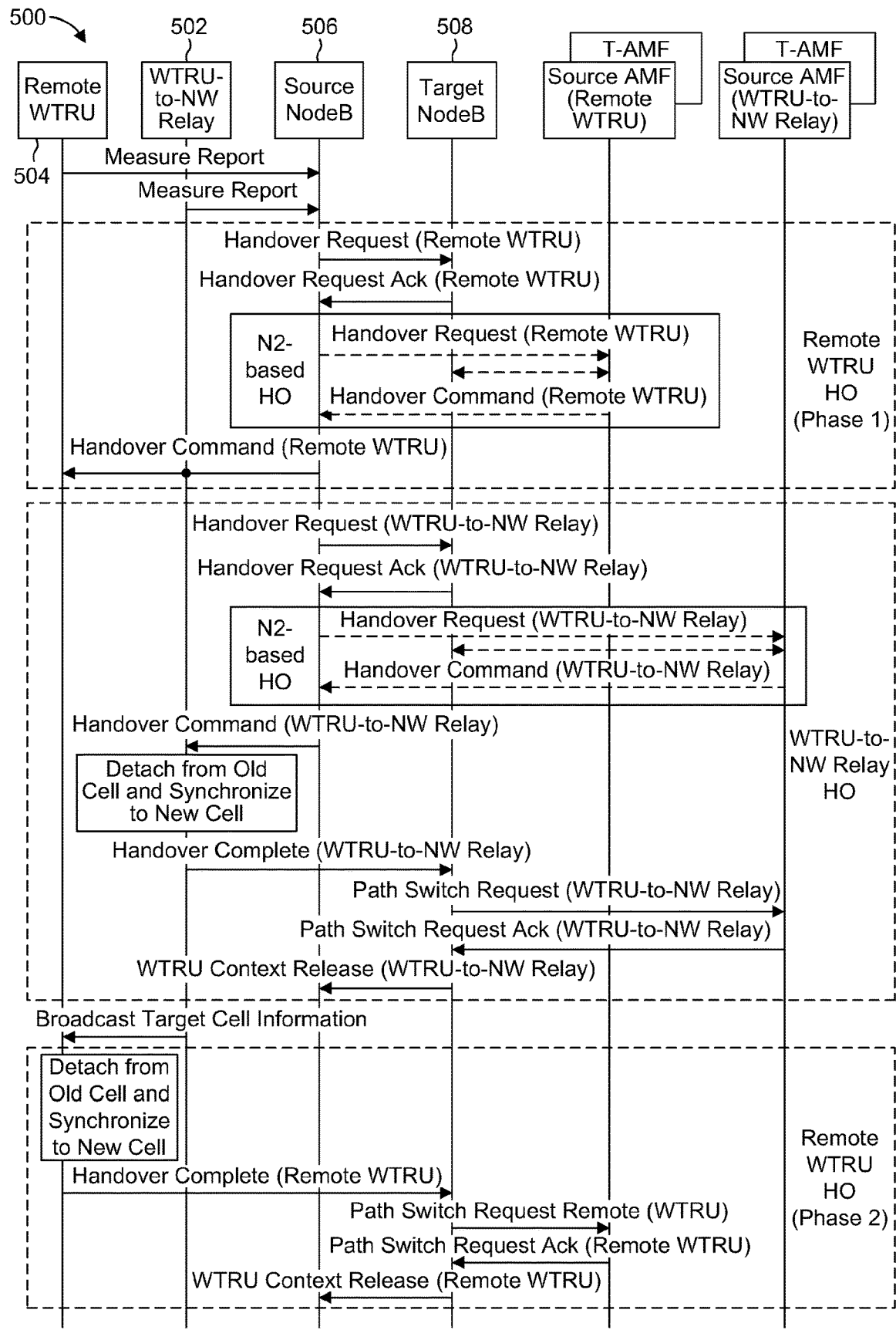
FIG. 5 is a diagram illustrating a handover procedure for WTRU-to-Network Relay together with a remote WTRU according to some embodiments.

FIG. 5 is a diagram illustrating a handover procedure 500 for WTRU-to-Network Relay 502 together with a remote WTRU 504 according to some embodiments. Even though the handover procedure for WTRU-to-network relay 502 and handover procedure for remote WTRU 504 may be performed separately, the RAN may synchronize two handover procedures, as shown in FIG. 5. For example, a handover command 505 for the WTRU-to-Network relay 502 may be sent to the remote WTRU 504, otherwise, once the WTRU-to-Network relay 502 detaches from the old cell and synchronizes with a new cell, the WTRU-to-Network relay 502 cannot forward the handover command for the remote from the source NodeB (e.g., a gNB) 506 to the remote WTRU 504.

The handover procedure may be canceled by the network. For example, before sending a Handover Command to the WTRU 504, the source NodeB 506 may attempt cancellation of handover during the handover procedure. This cancelation may occur due to various reasons including but not limited to timer expiration, internal failure, WTRU returned to source NodeB, and the like.

The handover procedure may also fail due to, for example, the WTRU 504 failing to access the target NodeB (e.g., a gNB) 508. If the handover procedure fails, the WTRU 504 may return to the source NodeB 506 and trigger the radio resource control (RRC) connection re-establishment procedure to recover the connection with the source NodeB 506.

For the WTRU-to-Network relay 502 handover together with remote WTRU 604, once the handover command has been sent to the remote WTRU 504 and the handover procedure for the WTRU-to-Network relay 502 fails or is canceled, the WTRU-to-Network relay 502 may never access the new cell and broadcast new cell information. Since the Remote WTRU 504 is still waiting to receive broadcast target cell information to perform the rest of the procedure, the remote WTRU 504 may enter a pending status and remove all bearer context after a failure timer expires. This may cause all ongoing services on the remote WTRU 504 to be interrupted.

Figure 6:
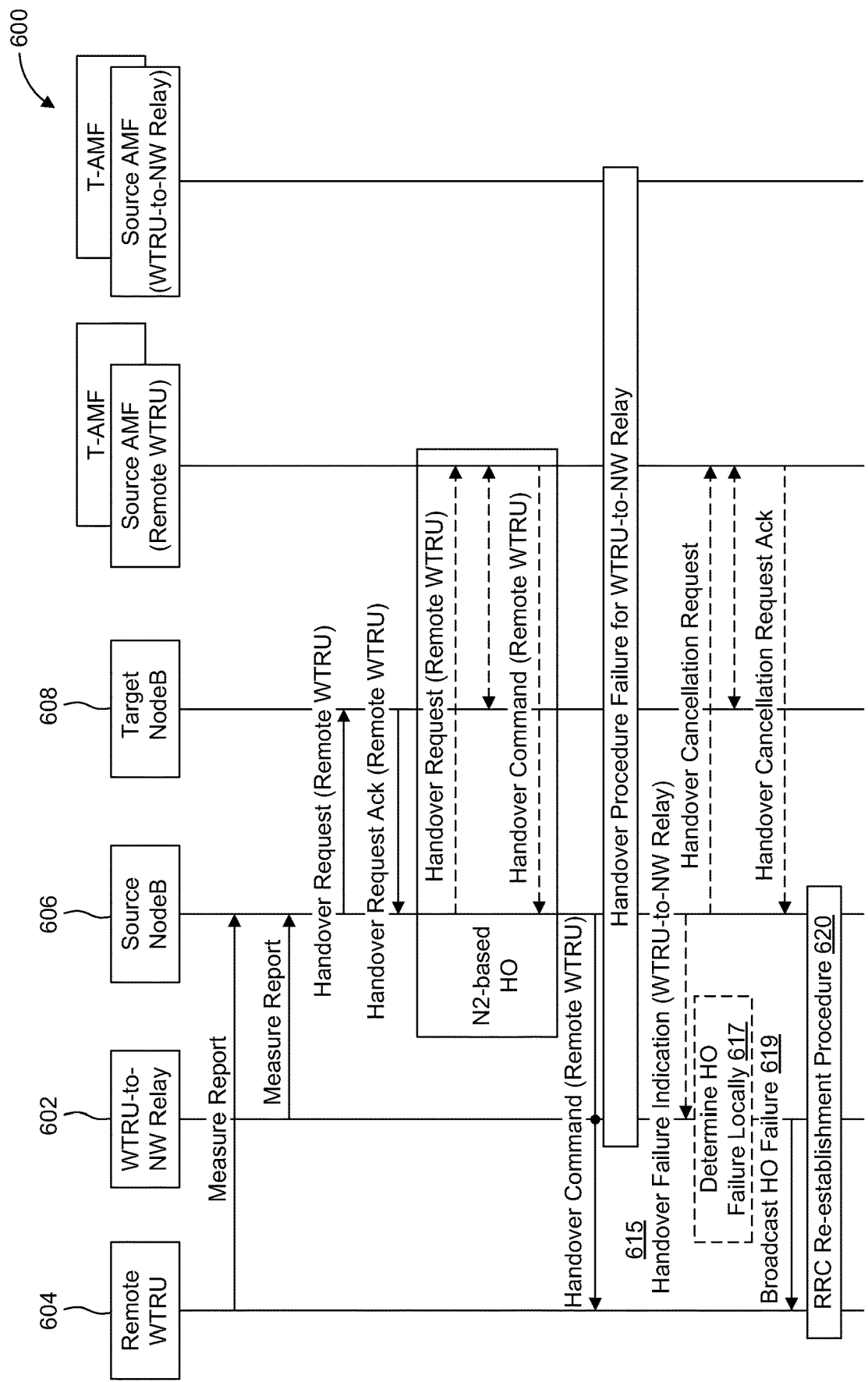
FIG. 6 is a diagram illustrating a handover failure/cancellation procedure on PC5 according to some embodiments.

FIG. 6 is a diagram illustrating a handover failure/cancellation procedure 600 on PC5 according to some embodiments. In embodiments as illustrated in FIG. 6, the WTRU-to-Network relay 602 may determine at 617 that the handover procedure for WTRU-to-Network relay 602 fails or is canceled. The WTRU-to-Network relay 602 may then notify at 619 one or more remote WTRUs 604 about the ongoing handover procedure failure or cancellation on PC5 interface. Next, the one or more remote WTRUs 604 may initiate at 620 a RRC connection re-establishment procedure to recover the connection with a source NodeB (e.g., a gNB).

In some embodiments, the WTRU-to-Network relay may determine handover failure or cancellation based on a local decision at 617 or receive a handover failure indication at 615. For example, the WTRU-to-Network relay 602 may determine handover failure or cancellation may be determined based on failed access of target NodeB 608 or based on a handover failure or cancellation indication received from the source NodeB 606 at 615.

In some embodiments, the WTRU-to-Network relay 602 may notify at 619 one or more remote WTRUs 604 about the handover failure or cancellation by broadcasting a handover failure or cancellation indication at 619 or by a RRC re-establishment indication at 620.

In some embodiments, the WTRU-to-Network relay 602 may notify one or more remote WTRUs 604 about the handover failure or cancellation on PC5 interface together with the serving cell information. For example, if the WTRU-to-Network relay 602 returns to the source NodeB 606 after the handover failure or cancellation, the WTRU-to-Relay network may include source NodeB information, such as cell ID, in a PC5 message. If the WTRU-to-Network relay 602 accesses a new NodeB (neither source nor target NodeB) after the handover failure or cancellation, the WTRU-to-Network relay may include the new NodeB (e.g., gNB) information (e.g., cell ID) in a PC5 message.

The WTRU-to-Network relay 602 may receive at 615 a handover failure or cancellation indication from the source NodeB 606 or may determine the handover procedure failure based on a local decision at 617, such as failed to access target NodeB (e.g., a gNB). Notably, in some embodiments, regardless of the cause of the failure or cancellation of the handover procedure (e.g., target NodeB 608 rejecting a connection because of resource limitations or not responding), a handover failure or cancellation indication may at 615 be sent by source NodeB and received by the WTRU-to-Network relay 602. In some embodiments, the WTRU-to-Network may re-establish at 620 a RRC connection with source NodeB 606 or a new NodeB if the RRC connection needs to be recovered.

The WTRU-to-Network relay may broadcast at 619 or use a PC5 unicast link to indicate via a PC5-S message the handover failure/cancellation indication to one or more remote WTRUs 604 on PC5 interface. In some embodiments, the handover failure/cancellation indication is sent together with the serving cell information.

In some embodiments, the WTRU-to-Network relay 602 may broadcast in the discovery message with indication that the WTRU-to-Network is unavailable if the handover fails. The relay WTRU may remove the indication when it is able to connect to the new cell. Alternatively, or additionally, the relay WTRU may refrain from broadcasting the discovery message if it is able to connect with a new cell.

The Remote WTRU 604 may receive at 615 the handover failure/cancelation indication from the WTRU-to-Network relay 602 over PC5. In some embodiments, the Remote WTRU 604 may receive the handover failure/cancellation indication together with the serving cell information. The Remote WTRU 604 may cancel the ongoing handover procedure. For example, in some embodiments, the Remote WTRU 604 may remove target cell context and/or the internal timer for the handover procedure. The Remote WTRU 604 may at 620 re-establish the RRC connection with the source NodeB or a new NodeB based on the received serving cell information.

In the embodiment illustrated in FIG. 6, for the Remote WTRU 604, the reception of handover Command and the fact that it is using the Relay WTRU 602 to communicate with the network, may trigger a special action on the Remote WTRU side. In some embodiments, it will start a timer that will guard the "Pending State". If the handover is successful, and the remote WTRU may access the new cell, it may then deactivate the timer and continue to communicate with the network using this new cell. If the time expires and the Remote WTRU 602 has not been able to access a new cell, or it has received a handover failure indication from the Relay WTRU 602, then the Remote WTRU 602 may deactivate all resources tied to the Handover Command and tune back with its original cell and resume its connection.

During the WTRU-to-Network Relay, the source NodeB 606 may send at 615 a handover failure/cancellation indication to the WTRU-to-Network relay 602. The handover failure message may include an indication that the failure applies to both the Remote WTRU 604 and the Relay WTRU 602. The WTRU-to-Network relay 602 may then determine at 617 that an ongoing handover procedure fails or is cancelled locally. The WTRU-to-Network relay 602 may then broadcast at 619 or send unicast signaling with a handover failure/cancellation indication to the Remote WTRU 604. In some embodiments, the handover failure/cancellation indication is broadcast or sent with the serving cell information. The source NodeB 606 may then indicate to the core network the handover procedure cancellation. The remote WTRU 604 may then trigger the RRC re-establishment procedure at 620 to recover the connection with source NodeB 606. This may be done before or after the handover cancellation request and acknowledgement. In a preferred embodiment, the remote WTRU 604 may trigger the RRC re-establishment procedure at 620 immediately after and in response to receiving a handover failure/cancellation indication at 619.

Figure 7:
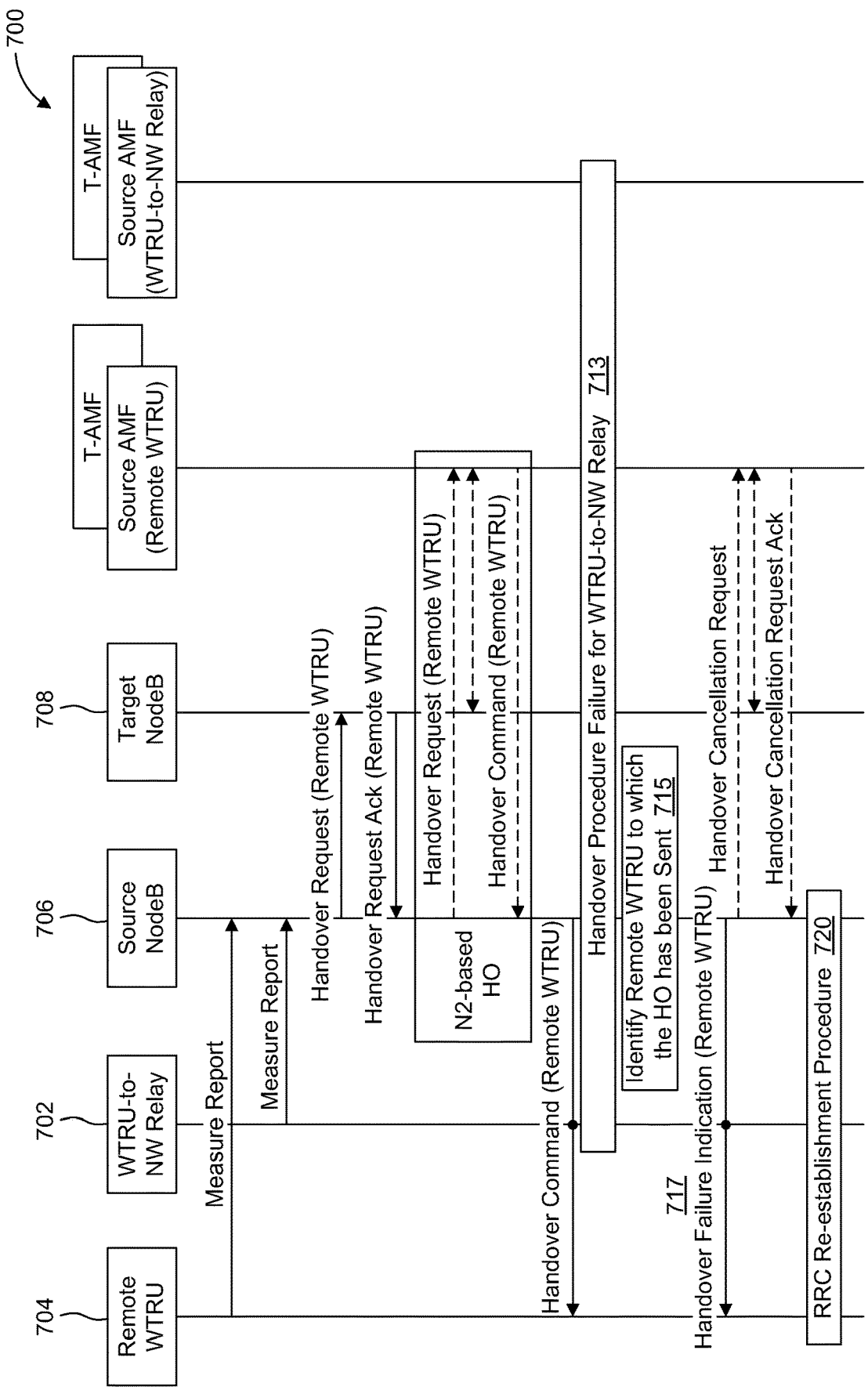
FIG. 7 is a diagram illustrating handover failure/cancellation procedure according to some embodiments.

FIG. 7 is a diagram illustrating handover failure/cancellation procedure 700 according to some embodiments. In embodiments as illustrated in FIG. 7, the source NodeB (e.g., a gNB) 706 may at 713 determine that the handover procedure to WTRU-to-Network relay 702 fails or is canceled and may at 715 identify one or more remote WTRUs 704 to which the handover command has been sent. The source NodeB 706 may then notify at 717 the one or more remote WTRUs 704 about the ongoing handover procedure failure or cancellation via WTRU-to-network relay 702. The remote WTRU 704 may then at 720 initiate an RRC connection re-establishment procedure to recover the connection with source NodeB 706.

In some embodiments, the source NodeB 706 maintains the remote WTRU 704 list to which the handover command has been sent to.

In some embodiments, after receiving handover command, the remote WTRUs 704 may maintain the connection with the source NodeB 706 for possible incoming failure/cancellation indication at 717 from the source NodeB 706 until the remote WTRU 704 connects to a new cell successfully.

The source NodeB 706 may at 713 determine if the handover procedure for WTRU-to-Network relay 702 fails or is canceled. The source NodeB 706 may at 715 also identify the remote WTRUs 704 impacted by the handover procedure failure, for example, one or more remote WTRUs 704 that the handover command has been sent to. The source NodeB 706 may also notify, at 717, one or more remote WTRU 704 about the ongoing handover procedure failure or cancellation via WTRU-to-Network relay 702.

The Remote WTRU 704 may receive the handover failure/cancellation indication at 717 from the source NodeB 706. The Remote WTRU 704 may then cancel the ongoing handover procedure. The handover procedure may be canceled by removing the target cell context or internal timer for the handover procedure. The Remote WTRU 704 may at 720 also re-establish the RRC connection with the source NodeB 706.

In embodiments as illustrated in FIG. 7, if the handover procedure for WTRU-to-Network relay 702 fails or is canceled and the WTRU-to-Network Relay 702 returns to source NodeB 706 (failure case) or keeps a connection with the Source NodeB 706 (cancellation case), the source NodeB 706 may identify the impacted remote WTRU 704.

The source NodeB 706 may then send a handover failure/cancellation indication to the remote UE 704. The source NodeB 706 may then indicate to the core network the handover procedure cancellation. The remote WTRU 704 may then trigger the RRC re-establishment procedure at 720 to recover the connection with the source NodeB 706.

In some embodiments, the source NodeB 706 may not send a Handover Command to the Remote WTRU 704. Instead, the source NodeB 706 may add the list of Remote WTRUs 704 for which the handover procedure has been initiated in the network (i.e., with the Remote WTRU target AMF) in the Handover Command Message sent to the WTRU-to-Network Relay 702. When receiving the Handover Command message, the WTRU-to-Network Relay 702 may trigger its handover to the target NodeB 708. If the handover completes successfully, the WTRU-to-Network Relay 702 sends a handover command to one or more Remote WTRUs 704, with the target NodeB information, over the PC5 interface. If the handover fails and the WTRU-to-Network Relay WTRU 702 gets back to the source NodeB 706, then nothing is sent to the one or more Remote WTRUs 704. If the handover fails and the WTRU-to-Network Relay WTRU connects to another NodeB (i.e., not the previous source NodeB 706 nor the target NodeB 708), then the WTRU-to-Network Relay 702 may send a Handover Command to the one or more Remote WTRUs 704 over the PC5 interface with the new NodeB information.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A relay wireless transmit/receive unit (WTRU) comprising:
    a processor; and
    a transceiver,
    wherein the transceiver is configured to receive, from a source nodeB, a handover command including an indication to begin a handover procedure to establish a connection between at least one remote WTRU and a target nodeB;
    wherein the processor and the transceiver are configured to begin another handover procedure to establish a connection between the relay WTRU and the target nodeB, wherein the connection between the relay WTRU and the target nodeB is to be used to establish the connection between the at least one remote WTRU and the target nodeB; and
    wherein the processor and the transceiver are configured to, based on a determination that the another handover procedure to establish a connection between the relay WTRU and the target nodeB is not complete, broadcast a first message indicating that the another handover procedure is not complete and indicating another target nodeB to which the relay WTRU is to establish a connection.

2. The relay WTRU of claim 1, wherein the processor and the transceiver are further configured to begin a handover procedure to establish a connection between the relay WTRU and the another target nodeB, wherein the connection between the relay WTRU and the another target nodeB is to be used to establish a connection between the at least one remote WTRU and the another target nodeB.

3. The relay WTRU of claim 1, wherein the first message includes an indication of the target nodeB for which the another handover procedure is not complete.

4. The relay WTRU of claim 1, wherein the another handover procedure is not complete due to cancellation or failure of the another handover procedure.

5. The relay WTRU of claim 4, wherein the transceiver is further configured to receive a second message from the source nodeB indicating cancellation of the another handover procedure.

6. The relay WTRU of claim 5, wherein the second message received from the source nodeB indicating cancellation of the another handover procedure further indicates cancellation of the handover procedure.

7. The relay WTRU of claim 1, wherein the first message is a discovery message.

8. A method performed by a relay wireless transmit/receive unit (WTRU) comprising:
    receiving, from a source nodeB, a handover command including an indication to begin a handover procedure to establish a connection between at least one remote WTRU and a target nodeB;
    beginning another handover procedure to establish a connection between the relay WTRU and the target nodeB, wherein the connection between the relay WTRU and the target nodeB is to be used to establish the connection between the at least one remote WTRU and the target nodeB; and
    broadcasting, based on a determination that the another handover procedure to establish a connection between the relay WTRU and the target nodeB is not complete, a first message indicating that the another handover procedure is not complete and indicating another target nodeB to which the relay WTRU is to establish a connection.

9. The method of claim 8 further comprising beginning a handover procedure to establish a connection between the relay WTRU and the another target nodeB, wherein the connection between the relay WTRU and the another target nodeB is to be used to establish a connection between the at least one remote WTRU and the another target nodeB.

10. The method of claim 8, wherein the first message includes an indication of the target nodeB for which the another handover procedure is not completed.

11. The method of claim 8, wherein the another handover procedure is not completed due to cancellation or failure of the another handover procedure.

12. The method of claim 11 further comprising receiving a second message from the source nodeB indicating cancellation of the another handover procedure.

13. The method of claim 12, wherein the second message received from the source nodeB indicating cancellation of the another handover procedure further indicates cancellation of the handover procedure.

14. The method of claim 8, wherein the first message is a discovery message.

15. A remote wireless transmit/receive unit (WTRU) comprising:
   a processor; and
   a transceiver,
   wherein the transceiver is configured to receive, from a relay WTRU, a handover command including an indication from a source nodeB to begin a handover procedure to establish a connection with a target nodeB;
   wherein the transceiver is configured to receive, from the relay WTRU, a first message indicating that a handover procedure to establish a connection between the relay WTRU and the target nodeB is not complete;
   wherein the transceiver is configured to receive a handover command from the relay WTRU including an indication to begin another handover procedure to establish a connection with another target nodeB; and
   wherein the processor and the transceiver are configured to transmit a second message using a connection established with the another target nodeB via the relay WTRU.

16. The remote WTRU of claim 15, wherein the second message transmitted using the connection established with the another target nodeB is transmitted to the another target nodeB via at least one relay WTRU.

17. The remote WTRU of claim 15, wherein the first message received from the relay WTRU includes an indication of the target nodeB for which the another handover procedure is not complete.

18. The remote WTRU of claim 15, wherein the second message transmitted using the connection established with the another target nodeB is transmitted directly from the remote WTRU to the another target nodeB.

19. The remote WTRU of claim 15, wherein the first message received from the relay WTRU includes an indication of the another target nodeB.

20. The remote WTRU of claim 15, wherein the another target nodeB and the source nodeB are different nodeBs.

* * * * *